US008904155B2

(12) United States Patent
Dieffenderfer et al.

(10) Patent No.: US 8,904,155 B2
(45) Date of Patent: Dec. 2, 2014

(54) REPRESENTING LOOP BRANCHES IN A BRANCH HISTORY REGISTER WITH MULTIPLE BITS

(75) Inventors: James Norris Dieffenderfer, Apex, NC (US); Bohuslav Rychlik, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/378,712

(22) Filed: Mar. 17, 2006

(65) Prior Publication Data

US 2007/0220239 A1 Sep. 20, 2007

(51) Int. Cl.
| | |
|---|---|
| G06F 15/00 | (2006.01) |
| G06F 7/38 | (2006.01) |
| G06F 9/00 | (2006.01) |
| G06F 9/44 | (2006.01) |
| G06F 9/38 | (2006.01) |

(52) U.S. Cl.
CPC .................... *G06F 9/3848* (2013.01)
USPC .......................................... 712/239; 712/240

(58) Field of Classification Search
USPC ................... 712/240, 239, 233, 238
See application file for complete search history.

(56) References Cited

U.S. PATENT DOCUMENTS

| | | | | | |
|---|---|---|---|---|---|
| 5,875,325 | A | * | 2/1999 | Talcott | 712/240 |
| 5,909,573 | A | * | 6/1999 | Sheaffer | 712/240 |
| 6,145,076 | A | * | 11/2000 | Gabzdyl et al. | 712/241 |
| 6,223,280 | B1 | | 4/2001 | Horton et al. | |
| 2001/0056531 | A1 | | 12/2001 | McFarling | |
| 2002/0194465 | A1 | * | 12/2002 | Sinharoy | 712/239 |
| 2003/0222883 | A1 | | 12/2003 | Deniau et al. | |
| 2004/0123075 | A1 | * | 6/2004 | Almog | 712/207 |
| 2005/0283593 | A1 | * | 12/2005 | Vasekin et al. | 712/240 |
| 2006/0190710 | A1 | * | 8/2006 | Rychlik | 712/240 |
| 2007/0079288 | A1 | * | 4/2007 | Willwerth et al. | 717/124 |

FOREIGN PATENT DOCUMENTS

| | | |
|---|---|---|
| EP | 1643357 | 4/2006 |
| JP | 6305442 | 1/1988 |
| JP | 6035442 A | 2/1994 |
| JP | 2004078599 A | 3/2004 |
| RU | 2236700 C2 | 9/2004 |
| WO | 2006091778 | 8/2006 |

OTHER PUBLICATIONS

International Search Report—PCT/US07/064331, International Search Authority—European Patent Office—Oct. 10, 2007.

(Continued)

*Primary Examiner* — George Giroux
(74) *Attorney, Agent, or Firm* — Peter Michael Kamarchik; Nicholas J. Pauley; Joseph Agusta

(57) ABSTRACT

In response to a property of a conditional branch instruction associated with a loop, such as a property indicating that the branch is a loop-ending branch, a count of the number of iterations of the loop is maintained, and a multi-bit value indicative of the loop iteration count is stored in a Branch History Register (BHR). In one embodiment, the multi-bit value may comprise the actual loop count, in which case the number of bits is variable. In another embodiment, the number of bits is fixed (e.g., two) and loop iteration counts are mapped to one of a fixed number of multi-bit values (e.g., four) by comparison to thresholds. Separate iteration counts may be maintained for nested loops, and a multi-bit value stored in the BHR may indicate a loop iteration count of only an inner loop, only the outer loop, or both.

33 Claims, 4 Drawing Sheets

(56) References Cited

OTHER PUBLICATIONS

Written Opinion—PCT/US07/064331, International Search Authority—European Patent Office—Oct. 10, 2007.
International Prellminary Report on Patentablility—PCT/US07/064331, ISA, The International Bureau of WIPO, Geneva, Switzerland—Sep. 23, 2008.
Po-Yung Chang et al: "Improving Branch Prediction Accuracy by Reducing Pattern History Table Interference" Parallel Architectures and Compilation Techniques, 1996., Proceedings of the 1996 Conference on Boston, MA, USA Oct. 20-23, 1996, Los Alamitos, CA, USA, IEEE Comput. SOC, US, Oct. 20, 1996, pp. 48-57.
European Search Report—EP12155320—Search Authority—The Hague—Jun. 6, 2012.
Nakada, T, et al., "High Speed Simulation of High Performance Processor," Proceedings of the Symposium on Advanced Computing Systems and Infrastructures SACSIS2003, The Information Processing Society of Japan, May 2003, vol. 2003, pp. 89-96.

* cited by examiner

REPRESENTING LOOP BRANCHES IN A BRANCH HISTORY REGISTER WITH MULTIPLE BITS

FIELD

The present disclosure relates generally to the field of processors and in particular to a method of representing loop branches in a branch history register with multiple bits.

BACKGROUND

Microprocessors perform computational tasks in a wide variety of applications. Improved processor performance is almost always desirable, to allow for faster operation and/or increased functionality through software changes. In common embedded applications, such as portable electronic devices, conserving power is also desirable.

Common modern processors employ a pipelined architecture, where sequential instructions, each having multiple execution steps, are overlapped in execution. For maximum performance, the instructions should flow continuously through the pipeline. Any situation that causes instructions to stall in the pipeline detrimentally affects performance. If instructions must be flushed from the pipeline and subsequently re-fetched, both performance and power consumption may suffer.

Commonly all real-world programs include conditional branch instructions, the actual branching behavior of which is commonly not known until the instruction is evaluated deep in the pipeline. To avoid a stall that may result from waiting for actual evaluation of the branch instruction, common modern processors employ some form of branch prediction, whereby the branching behavior of conditional branch instructions is predicted early in the pipeline. Based on the predicted branch evaluation, the processor speculatively fetches (prefetches) and executes instructions from a predicted address—either the branch target address (if the branch is predicted taken) or the next sequential address after the branch instruction (if the branch is predicted not taken). When the actual branch behavior is determined, if the branch was mispredicted, the speculatively fetched instructions must be flushed from the pipeline, and new instructions fetched from the correct next address. Prefetching instructions in response to an erroneous branch prediction adversely impacts processor performance and power consumption. Consequently, improving the accuracy of branch prediction is desirable.

Known branch prediction techniques include both static and dynamic predictions. The likely behavior of some branch instructions can be statically predicted by a programmer and/or compiler. One example is an error checking routine. Common code executes properly, and errors are rare. Hence, the branch instruction implementing a "branch on error" function will evaluate "not taken" a very high percentage of the time. Such an instruction may include a static branch prediction bit in the op code, set by a programmer or compiler with knowledge of the common likely outcome of the branch condition.

Dynamic prediction is generally based on the branch evaluation history (and in some cases the branch prediction accuracy history) of the branch instruction being predicted and/or other branch instructions in the same code. Extensive analysis of actual code indicates that recent past branch evaluation patterns may be a good indicator of the evaluation of future branch instructions.

One known form of dynamic branch prediction, depicted in FIG. 1, utilizes a Branch History Register (BHR) 100 to store the past n branch evaluations. In a simple implementation, the BHR 30 comprises a shift register. The most recent branch evaluation result is shifted in (for example, a 1 indicating taken and a 0 indicating not taken), with the oldest past evaluation in the register being displaced. A processor may maintain a local BHR 100 for each branch instruction. Alternatively (or additionally), a BHR 100 may contain the recent past evaluations of all conditional branch instructions, sometimes known in the art as a global BHR, or GHR. As used herein, BHR refers to both local and global Branch History Registers.

As depicted in FIG. 1, the BHR 100 may index a Branch Predictor Table (BPT) 102, which again may be local or global. The BHR 100 may index the BPT 102 directly, or may be combined with other information, such as the Program Counter (PC) of the branch instruction in BPT index logic 104. Other inputs to the BPT index logic 104 may additionally be utilized. The BPT index logic 104 may concatenate the inputs (known in the art as gselect), XOR the inputs (gshare), perform a hash function, or combine or transform the inputs in a variety of ways.

As one example, the BPT 102 may comprise a plurality of saturation counters, the MSBs of which serve as bimodal branch predictors. For example, each table entry may comprise a 2-bit counter that assumes one of four states, each assigned a weighted prediction value, such as:

11—Strongly predicted taken
10—Weakly predicted taken
01—Weakly predicted not taken
00—Strongly predicted not taken The counter increments each time a corresponding branch instruction evaluates "taken" and decrements each time the instruction evaluates "not taken." The MSB of the counter is a bimodal branch predictor; it will predict a branch to be either taken or not taken, regardless of the strength or weight of the underlying prediction. A saturation counter reduces the prediction error of an infrequent branch evaluation direction. A branch that consistently evaluates one way will saturate the counter. An infrequent evaluation the other way will alter the counter value (and the strength of the prediction), but not the bimodal prediction value. Thus, an infrequent evaluation will only mispredict once, not twice. The table of saturation counters is an illustrative example only; in general, a BHT may index a table containing a variety of branch prediction mechanisms.

Regardless of the branch prediction mechanism employed in the BPT 102, the BHR 100—either alone or in combination with other information such as the branch instruction PC—indexes the BPT 102 to obtain branch predictions. By storing prior branch evaluations in the BHR 100 and using the evaluations in branch prediction, the branch instruction being predicted is correlated to past branch behavior—its own past behavior in the case of a local BHR 100 and the behavior of other branch instructions in the case of a global BHR 100. This correlation is the key to accurate branch predictions, at least in the case of highly repetitive code.

Note that FIG. 1 depicts branch evaluations being stored in the BHR 100—that is, the actual evaluation of a conditional branch instruction, which may only be known deep in the pipeline, such as in an execute pipe stage. While this is the ultimate result, in practice, common high performance processors store the predicted branch evaluation from the BPT 102 in the BHR 100, and correct the BHR 100 later as part of a misprediction recovery operation if the prediction turns out to be erroneous. The drawing figures do not reflect this implementation feature, for clarity.

A common code structure that may reduce the efficacy a branch predictor employing a BHR 100 is the loop. A loop ends with a conditional branch instruction that tests a loop-ending condition, such as whether an index variable that is incremented each time through the loop has reached a loop-ending value. If not, execution branches back to the beginning of the loop for another iteration, and another loop-ending conditional branch evaluation.

If the loop executes through a large number of iterations, the "taken" backwards branches of the loop-ending branch instruction partially or fully saturate the BHR 100. Where the number of loop iterations equals or exceeds the BHR 100 width, at the end of the loop an n-bit BHR will contain precisely n−1 ones (taken) followed by a single zero (not taken), corresponding to a long series of branch taken evaluations resulting from the loop iterations, and ending with a single not-taken branch evaluation when the loop terminates. This effectively destroys the efficacy of the BHR 100, as all correlations with prior branch evaluations (for either a local or global BHR 100) are lost. In this case, the BHR 100 will likely map to the same BPT 102 entry for a given branch instruction (depending on the other inputs to the BPT index logic 104), rather than to an entry containing a branch prediction that reflects the correlation of the branch instruction to prior branch evaluations.

Additionally, the saturated BHR 100 may increase aliasing in the BPT 102. That is, all branch instructions following loops with common iterations will map to the same BPT 102 entry, if the BHR 100 directly indexes the BPT 102. Even where the BHR 100 is combined with other information, the chance of aliasing is increased. This adversely impacts prediction accuracy not only for the branch instruction following the loop, but also for all of the branch instructions that alias to its entry in the BPT 102.

If the loop executes through fewer iterations than the width of the BHR 100, the BHR 100 is not saturated and some prior branch evaluation history is retained. However, the bits representing the prior branch evaluation history are displaced in the BHR 100 by numerous "taken" results of the loop-ending branch instruction. Particularly where the number of loop iterations varies, this has two deleterious effects on branch prediction. First, the branch instruction will map to a much larger number of entries in the BPT 102 to capture the same correlation with prior branch evaluations, requiring a larger BPT 102 to support the same accuracy for the same number of branch instructions than would be required without the loop-ending branch affecting the BHR 30. Second, the branch predictors in the BPT 102 will take longer to "train," increasing the amount of code that must execute before the BPT 102 begins to provide accurate branch predictions.

Patent application Ser. No. 11/066,508, assigned to the assignee of the present application and incorporated herein by reference, proposes to suppress updating the BHR 100 for loop-ending branch instructions. This resolves most of the deleterious effects of BHR 100 saturation or partial saturation on branch prediction accuracy. However, it fails to capture and exploit correlations that may exist between loop behavior and subsequent branch evaluation.

In common applications, the evaluation of a branch instruction may be correlated to the number of iterations of a preceding loop. For example, a scientific program may capture data points in a loop and, following the loop, branch to a statistical analysis subroutine where the captured data is analyzed. However, if the loop iterates relatively few times, capturing few data points and yielding a small sample, statistical analysis may be unreliable, and may be skipped. In this case, the evaluation of the conditional instruction branching to the statistical analysis subroutine is strongly correlated to the number of iterations of the data acquisition loop.

In another example, an application may use a loop structure to search through a list, transaction log, history file, or similar data structure. If an item matching the search parameters appears frequently in the list, relatively few loop iterations will be required to locate the item. Consequently, an item appearing infrequently may require a large number of iterations through the search loop. The evaluation of a subsequent branch instruction may be correlated to the frequency with which a particular item appears in the list, and hence correlated to the number of loop iterations required to locate the item.

Suppressing the update of the BHR 100 in response to loop-ending branch instruction evaluations fails to capture any correlation between the number of loop iterations and the branch behavior of a subsequent branch instruction. On the other hand, maintaining a full history of the evaluations of the loop-ending branch instruction fully or partially saturates the BHR 100, losing the correlation to branch instruction evaluations prior to the loop.

SUMMARY

In response to a property of a conditional branch instruction associated with a loop, such as a property indicating that the branch is a loop-ending branch, a count of the number of iterations of the loop is maintained, and a multi-bit value indicative of the loop iteration count is stored in the BHR. In one embodiment, the multi-bit value may comprise the actual loop count, in which case the number of bits is variable. In another embodiment, the number of bits is fixed (e.g., two) and loop iteration counts are mapped to a multi-bit value by comparison to thresholds. Separate iteration counts may be maintained for nested loops, and a multi-bit value stored in the BHR may indicate a loop iteration count of only an inner loop, only the outer loop, or both.

One embodiment relates to a method of branch prediction. A property of a branch instruction associated with a loop is identified. In response to the property, a multi-bit value is stored in a BHR, the multi-bit value indicative of the number of iterations of a loop associated with the branch instruction.

Another embodiment relates to a processor. The processor includes a branch predictor operative to predict the evaluation of conditional branch instructions, and an instruction execution pipeline operative to speculatively fetch and execute instructions based on a prediction from the branch predictor. The processor also includes a BHR operative to store the evaluation of conditional branch instructions, and a loop counter operative to count the number of iterations of a code loop. The processor further includes a control circuit operative to store in the BHR a multi-bit value indicative of the number of iterations of a loop associated with a conditional branch instruction.

DETAILED DESCRIPTION

Figure 1:
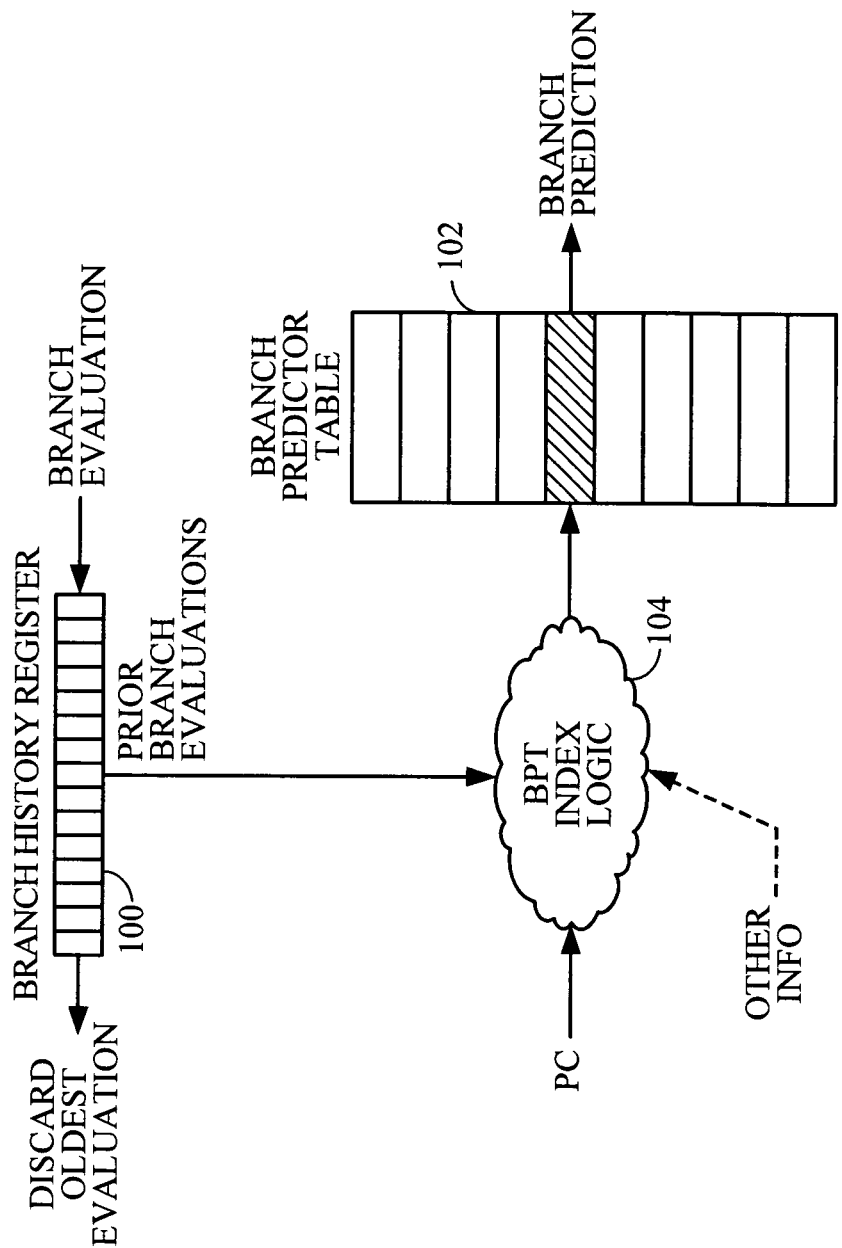
FIG. 1 is a functional block diagram of a prior art branch predictor circuit.
Figure 2:
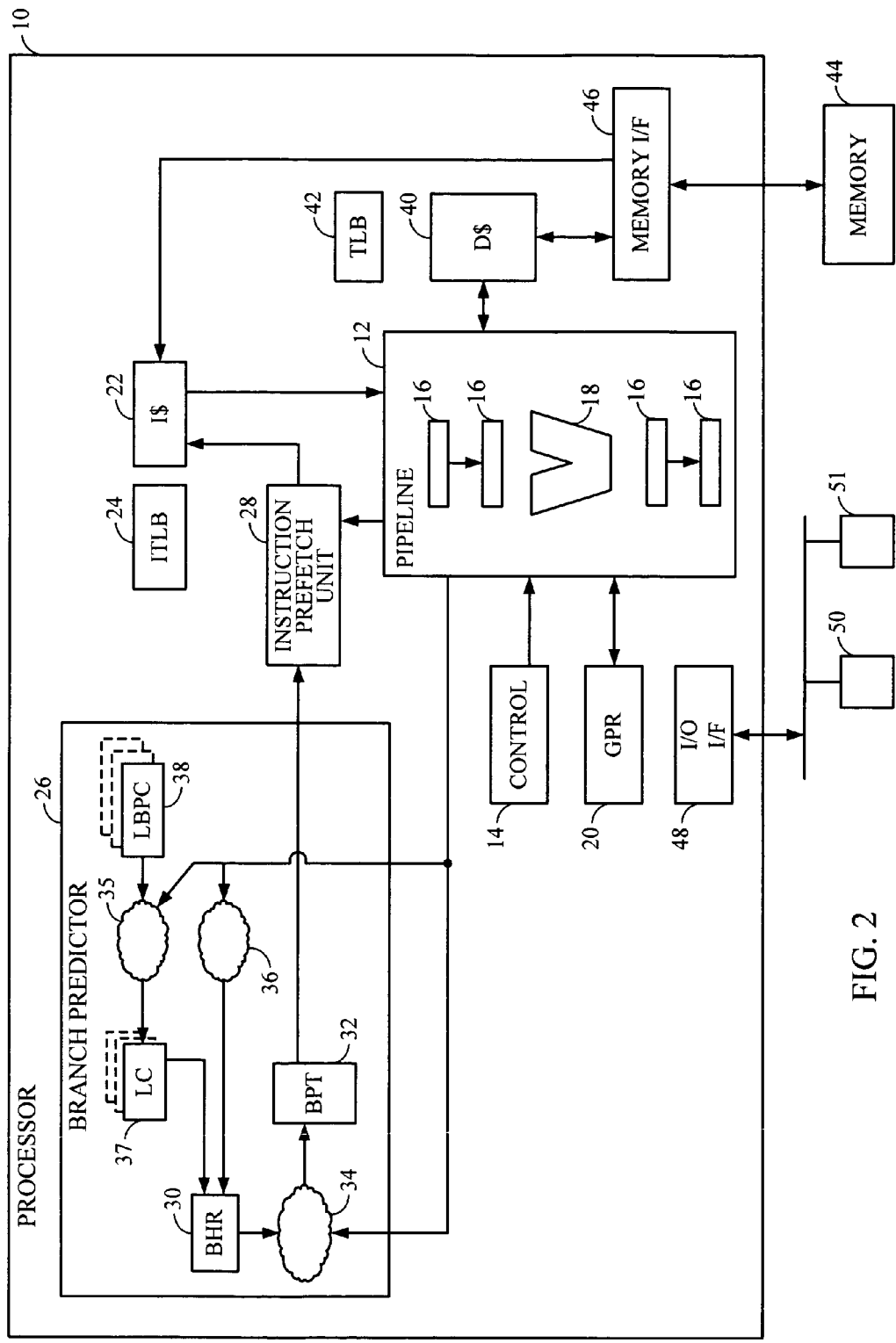
FIG. 2 is a functional block diagram of a processor.

FIG. 2 depicts a functional block diagram of a processor 10. The processor 10 executes instructions in an instruction execution pipeline 12 according to control logic 14. In some embodiments, the pipeline 12 may be a superscalar design, with multiple pipelines. The pipeline 12 includes various registers or latches 16, organized in pipe stages, and one or more Arithmetic Logic Units (ALU) 18. A General Purpose Register (GPR) file 20 provides registers comprising the top of the memory hierarchy.

The pipeline 12 fetches instructions from an instruction cache (I-cache) 22, with memory address translation and permissions managed by an Instruction-side Translation Lookaside Buffer (ITLB) 24. When conditional branch instructions are decoded early in the pipeline 12, a branch predictor 26 predicts the branch behavior, and provides the prediction to an instruction prefetch unit 28. The instruction prefetch unit 28 speculatively fetches instructions from the I-cache 22, at a branch target address calculated in the pipeline 12 for "taken" branch predictions, or at the next sequential address for branches predicted "not taken." In either case, the prefetched instructions are loaded into the pipeline 12 for speculative execution.

The branch predictor 26 includes a Branch History Register (BHR) 30, a Branch Predictor Table (BPT) 32, BPT index logic 34, and BHR update logic 36. The branch predictor 26 may additionally include one or more Last Branch PC registers 38, and one or more loop counters 37 providing inputs to the BHR update logic 36.

Data is accessed from a data cache (D-cache) 40, with memory address translation and permissions managed by a main Translation Lookaside Buffer (TLB) 42. The TLB 42 may be a dedicated data TLB, or may comprise an integrated TLB that manages address translations and permissions for both instructions and data. Additionally, in various embodiments of the processor 10, the I-cache 22 and D-cache 40 may be integrated, or unified. Misses in the I-cache 22 and/or the D-cache 40 cause an access to main (off-chip) memory 44, under the control of a memory interface 46.

The processor 10 may include an Input/Output (I/O) interface 48, controlling access to various peripheral devices 50, 52. Those of skill in the art will recognize that numerous variations of the processor 10 are possible. For example, the processor 10 may include a second-level (L2) cache for either or both the I and D caches 22, 40. In addition, one or more of the functional blocks depicted in the processor 10 may be omitted from a particular embodiment.

Multi-Bit Indications of Loop Iterations

According to one or more embodiments, branch prediction accuracy is improved by correlating branch evaluation to both previous branch evaluations and the iteration count of previous loops. This is accomplished by storing a multi-bit value indicative of loop iteration count(s) in the BHR 30. By mapping potentially large loop iteration counts to relatively few bits, characteristic information about the loop is preserved while preventing the loop-ending branches from fully or partially saturating one or more BHRs 30 in the branch predictor 26.

Figure 3:
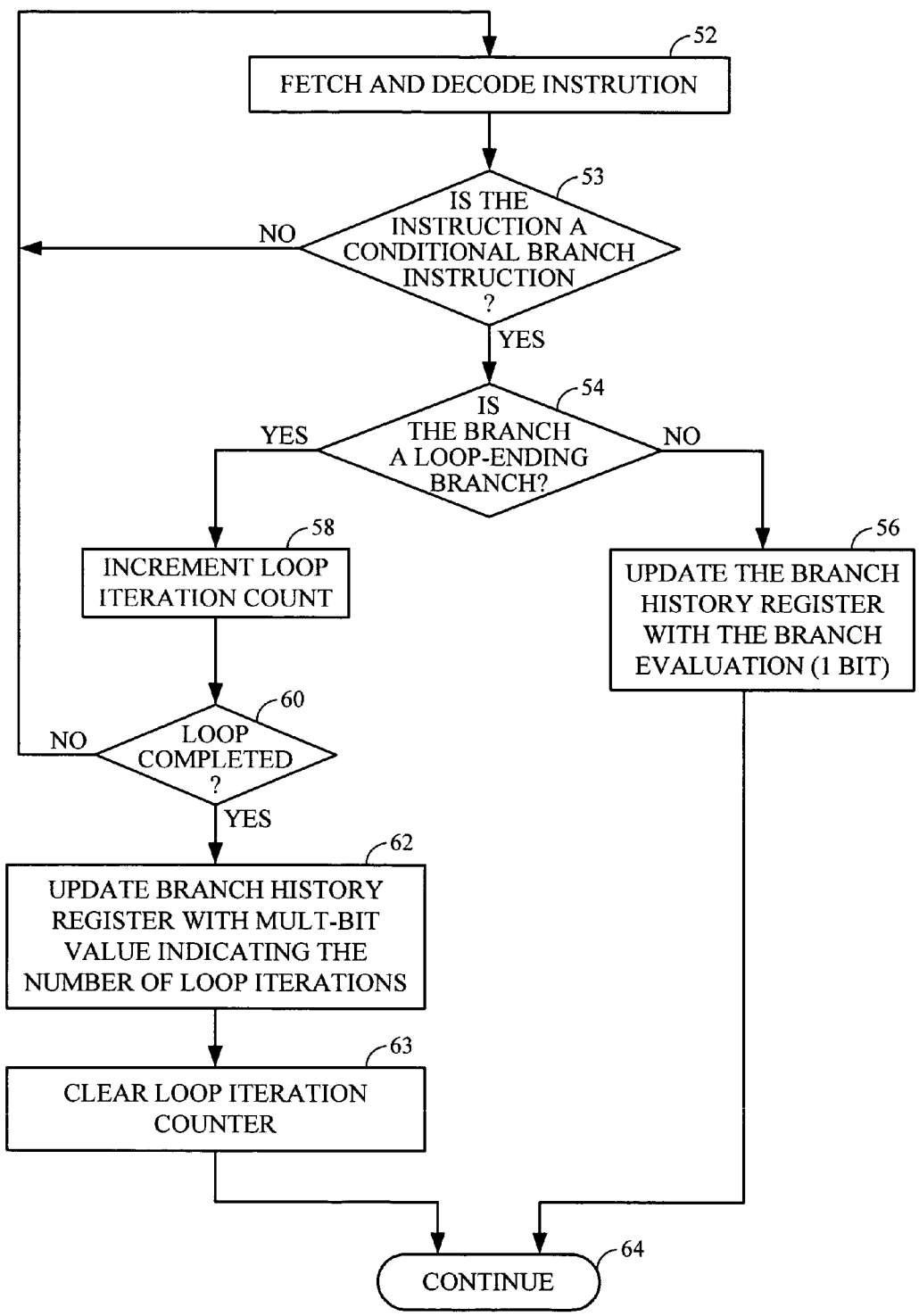
FIG. 3 is a flow diagram of a method of executing a branch instruction.

This process is depicted as a flow diagram in FIG. 3. An instruction is fetched and decoded (block 52). If the instruction is a not conditional branch instruction (block 53), it proceeds in the pipeline and the process returns to fetch the next instruction (block 52). If the instruction is a conditional branch instruction (block 53), a determination is made whether the branch is a loop-ending branch (block 54). If not, when the branch evaluates (such as in an execute stage of the pipeline) the BHR 30 is updated to record the branch evaluation using a single bit (block 56), i.e., whether the branch instruction evaluated as "taken" or "not taken." Execution then continues (block 64) at the branch target address or the next sequential address, respectively. If the branch is a loop-ending branch (block 54), a loop iteration count is incremented (block 58). When the loop completes (block 60), a multi-bit value indicative of the number of loop iterations is written to the BHR 30 (block 62). The loop iteration counter is then cleared (block 63) and execution continues (block 64) at the next sequential address.

Both the query (block 54)—that is, identifying a branch instruction as a loop-ending branch instruction—and maintaining the loop iteration count (block 58) may be accomplished in a variety of ways. In one embodiment, one or more Loop Counters (LC) 37 are incremented when a conditional branch instruction that is determined to be a loop-ending branch evaluates "taken." The value of the LC 37, or a value derived therefrom (as discussed more fully herein), is written to the BHR 30 when the loop-ending branch evaluates "not taken," indicating an exit of the loop. The LC 37 is also cleared at that time.

Identifying Loop-Ending Branch Instructions

Figure 4:
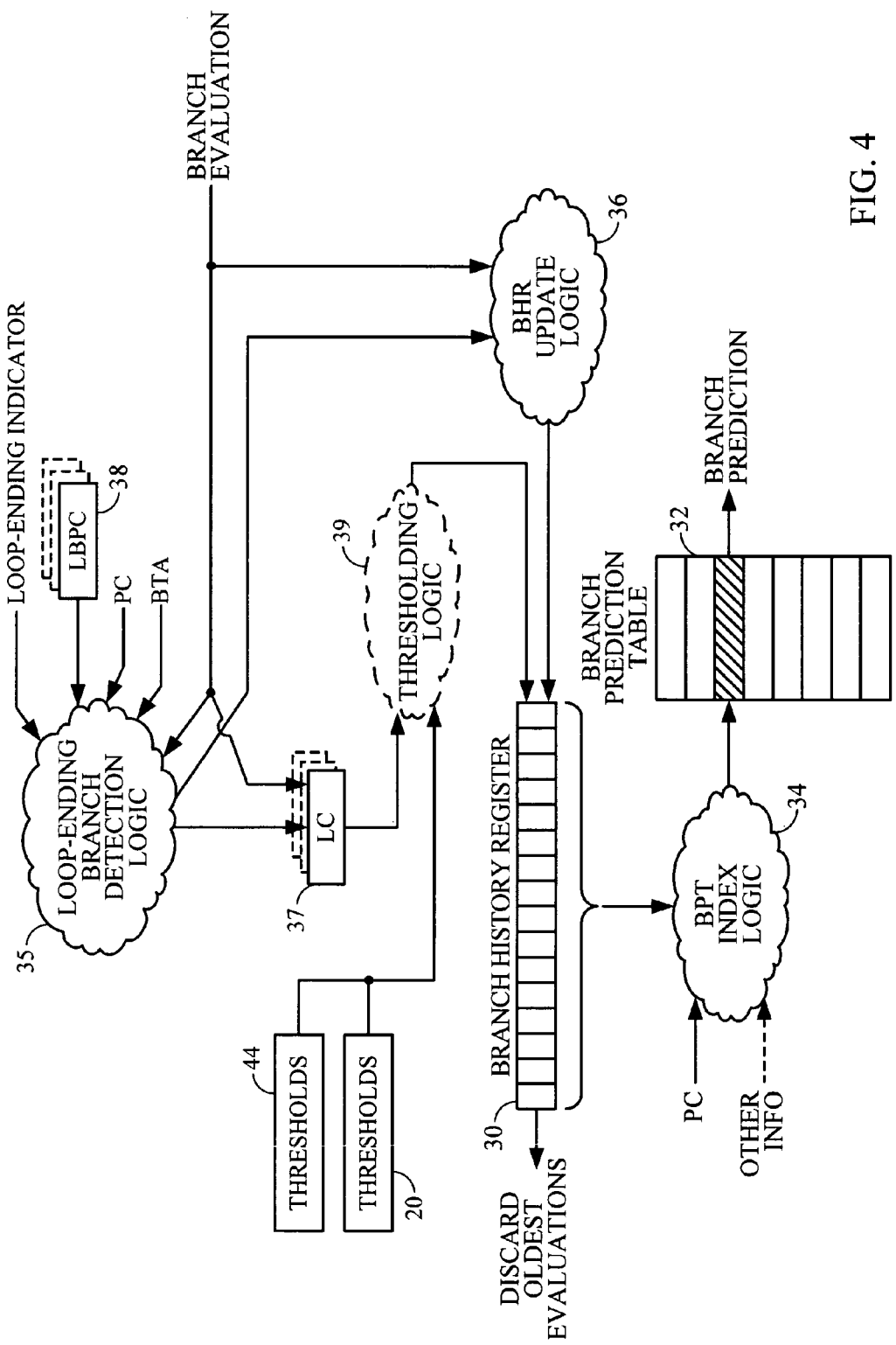
FIG. 4 is a functional block diagram of a branch predictor circuit including one or more Last Branch PC registers and Loop Counters.

Loops iterate by branching backwards from the end of the loop to the beginning of the loop. According to one embodiment, every conditional branch instruction with a branch target address less than the branch instruction address, or PC—that is, a backwards branch—is assumed to be a loop-ending branch instruction. This method of identifying Loop-Ending branches offers simplicity. As depicted in FIG. 4, the branch instruction PC is compared to the branch target address (BTA) in Loop-Ending Branch Detection logic 35 when the branch instruction is actually evaluated in the pipeline. If BTA<PC, a Loop Counter (LC) 37 is incremented. This embodiment requires an address comparison when the branch target address is determined, and may suffer from some inaccuracy as not all backward branches are loop-ending branches.

Another way to detect a loop-ending branch is to recognize repeated execution of the same branch instruction. In one embodiment, as depicted in FIG. 4, a Last Branch PC (LBPC) register 38 stores the PC of the last branch instruction executed. In the case of a simple loop, if the PC of a branch instruction matches the LBPC 38 in the Loop-Ending Branch Detection logic 35—that is, the branch instruction was the last branch instruction evaluated—the branch instruction is assumed to be a loop-ending branch instruction, and a LC 37 is incremented.

Code that includes conditional branch instructions within a loop can complicate loop-ending branch detection. For example, common algorithms for searching an array or linked list create a loop. A branch within the loop checks for a match and exits the loop early if a match is found, while a loop-ending branch checks for the end of the array or linked list. In this case, a single LBPC 38 cannot detect the loop-ending branch, because it will be alternately overwritten by the two branch PCs. Accordingly, in one embodiment, two or more LBPC registers 38 may be provided (as depicted in FIG. 4), with the PCs of successively evaluated branch instructions stored in corresponding LBPC registers ($LBPC_0$, $LBPC_1$, ... $LBPC_M$) 38. This allows for the detection of loop-ending branches even in the presence of other conditional branches within the loop.

Loop-ending branch instructions may also be statically marked by a compiler or assembler. In one embodiment, a compiler generates a particular type of branch instruction that is only used for loop-ending branches, for example, "BRLP". The BRLP instruction is recognized, and a LC 37 is incremented every time a BRLP instruction evaluates as taken in an execution pipe stage. In another embodiment, a compiler or assembler may embed a loop-ending branch indication in a branch instruction, such as by setting one or more predefined bits in the instruction op code. The loop-ending branch bits are detected, and a LC 37 is incremented when that branch instruction evaluates as taken in an execute pipe stage. In general, a Loop-Ending Indicator may be provided to the Loop-Ending Branch Detection logic 35. Static identification of loop-ending branches reduces hardware and computational complexity by moving the loop-ending identification function into the compiler or assembler.

Generating and Storing an Indicator of the Number of Loop Iterations

Regardless of the technique used to identify a loop-ending branch instruction (for either an inner or outer loop), according to one or more embodiments, an indication of the number of times the loop iterates is stored in the BHR 30, to exploit any correlation between the number of loop iterations and subsequent conditional branch instruction evaluation.

In one embodiment, the actual count of loop iterations is stored in the BHR 30. That is, the multi-bit count from, e.g., a LC 37 is shifted into the BHR 30, displacing prior branch evaluations in the MSBs of the BHR 30. For very large loops, this count will require $\log_2$ (n) bits for n loop iterations, displacing a corresponding number of prior branch evaluations. However, even for large loop iteration counts, the binary representation is a significant compression of the loop-ending branch behavior stored in prior art branch history registers (i.e., n−1 ones followed by a single zero). In one embodiment, the iteration count is accumulated in a LC 37 and shifted into the BHR 30. In another embodiment (not shown), at least the lower k bits of the BHR 30 may be implemented as a dual-mode shift-register/counter, and the loop iteration count may be incremented directly in the BHR 30 (with prior BHR 30 contents shifting left as the count grows).

In another embodiment, a fixed, multi-bit indication of the number of loop iterations is stored in the in the BHR 30. For example, two bits may be allocated to record an indication of the number of loop iterations, with the following meanings:

11—Very large number of loop iterations
10—Large number of loop iterations
01—Moderate number of loop iterations
00—Small number of loop iterations In this example, three threshold values—between small and moderate (00->01); between moderate and large (01->10), and between large and very large (10->11)—are used to map the actual loop iteration count to a two-bit representation, as indicated by Thresholding logic 39. In one embodiment, the threshold values may be fixed for a given processor implementation, such as for certain embedded applications where common loop sizes are generally known. In another embodiment, the mapping may be scalable, with the threshold values read from GPRs 20, a table in memory 44, or the like. In common applications, a fixed multi-bit indication of the number of loop iterations may provide sufficient indication of the loop iteration count to allow for meaningful correlation with branch evaluation behavior, while at the same time limiting the number of prior branch evaluations displaced from the BHR 30 by loop-ending branches.

Of course, actual loop iteration counts may be mapped to any fixed number of bits, with the corresponding number of threshold values, e.g., three bits and seven thresholds; four bits and fifteen thresholds; etc., to achieve the desired or required balance between loop iteration count accuracy and branch evaluation displacements in the BHR 30.

Nested Loops

A loop may contain one or more nested, or inner, loops. Accordingly, in one embodiment, a plurality of LC counters ($LC_0, LC_1, \ldots LC_M$) 37 are provided, which may correspond to the number of LBPC 38 registers. A LC 37 is incremented upon a taken evaluation and a match with the relevant $LBPC_M$ 38, to maintain the iteration counts of nested loops.

By storing a multi-bit indication of the number of iterations of an inner loop every time the inner loop exits, the BHR 30 may become partially or completely saturated by the time the outer loop iterates relatively few times. Accordingly, in one embodiment, once a loop is determined to be an inner loop, subsequent iteration counts after an initial execution of the inner loop may be suppressed from updating the BHR 30. In this embodiment, by the time the outer loop exits, the BHR 30 will include an indication of the iteration count of the inner loop only for the first iteration of the outer loop, and an indication of the iteration count of the outer loop.

In another embodiment, the inner loop iteration count may be discarded by overwriting its value in the BHR 30 with an indication of the outer loop iteration count. This preserves the greatest number of prior branch evaluations in the BHR 30, while allowing for correlation of subsequent branch evaluations with the iteration count of the outer loop.

In another embodiment, the outer loop iteration count may be discarded by suppressing an update of the BHR 30 when the outer loop exits. This again preserves the greatest number of prior branch evaluations in the BHR 30, while allowing for correlation of subsequent branch evaluations with the iteration count of the inner loop, which may be more predictive of subsequent branch evaluation in some applications.

A conditional branch instruction has common properties, including for example the branch instruction address or PC, the instruction type, and the presence, vel non, of indicator bits in the op code. As used herein, properties of the branch operation, and/or properties of the program that relate to the branch, are considered properties of the branch instruction. For example, whether the branch instruction PC matches the contents of one or more LBPC registers 38, and whether the branch target address is forward or backward relative to the branch instruction PC, are properties of the branch instruction.

Although the present disclosure has been described herein with respect to particular features, aspects and embodiments thereof, it will be apparent that numerous variations, modifications, and other embodiments are possible within the broad scope of the present disclosure, and accordingly, all variations, modifications and embodiments are to be regarded as being within the scope of the disclosure. The present embodiments are therefore to be construed in all aspects as illustrative and not restrictive and all changes coming within the meaning and equivalency range of the appended claims are intended to be embraced therein.

What is claimed is:

1. A method of branch prediction, comprising:
   determining that a conditional branch instruction is a loop-ending branch instruction;
   counting a total number of iterations of a loop ended by the loop-ending branch instruction;
   storing a multi-bit value in a Branch History Register (BHR), the value equal to the total number of iterations of the loop upon termination of the loop; and
   indexing a Branch Predictor Table (BPT) with at least the BHR, after termination of the loop, to obtain a branch prediction for one or more conditional branch instructions following the loop-ending branch instruction, the branch prediction based at least in part on the multi-bit value stored in the BHR.

2. The method of claim 1 wherein determining that a conditional branch instruction is a loop-ending branch instruction comprises detecting that the conditional branch is backwards in program flow direction.

3. The method of claim 1 wherein determining that a conditional branch instruction is a loop-ending branch instruction comprises detecting that a PC of the branch instruction matches the contents of a Last Branch PC (LBPC) register storing a PC of the last branch instruction to update the BHR.

4. The method of claim 1 wherein determining that a conditional branch instruction is a loop-ending branch instruction comprises detecting that a PC of the branch instruction matches the contents of any of a plurality of LBPC registers storing PCs of the last plurality of branch instructions to update the BHR.

5. The method of claim 1 wherein the loop-ending branch instruction is a unique branch instruction generated by a compiler for ending loops.

6. The method of claim 1 wherein an opcode of the loop-ending branch instruction includes one or more bits indicating it is a loop-ending branch instruction.

7. The method of claim 1 wherein storing a multi-bit value in the BHR comprises storing a predetermined number of bits in the BHR.

8. The method of claim 7 further comprising determining the value of the predetermined number of bits according to a fixed mapping of the number of loop iterations to the multi-bit value.

9. The method of claim 7 further comprising determining the value of the predetermined number of bits according to a scalable mapping of the number of loop iterations to the multi-bit value.

10. The method of claim 9 further comprising reading a plurality of thresholds to determine the scalable mapping of the number of loop iterations to the multi-bit value.

11. The method of claim 1 wherein storing a multi-bit value in the BHR comprises storing a variable number of bits in the BHR, the number of bits varying in response to the total number of iterations of the loop.

12. The method of claim 11 further comprising storing loop iterations in the least significant plurality of bits of the BHR.

13. The method of claim 11 further comprising counting loop iterations in a loop counter, and transferring the value of the loop counter to the BHR when the loop terminates.

14. The method of claim 1 wherein the determining step comprises detecting a first loop-ending branch instruction associated with a first loop and a second loop-ending branch instruction associated with a second loop, the first loop nested within the second loop.

15. The method of claim 14 wherein storing a multi-bit value in the BHR comprises storing a multi-bit value indicative of the number of iterations of the first loop in the BHR, and further comprising storing a multi-bit value indicative of the number of iterations of the second loop in the BHR.

16. The method of claim 14 wherein storing a multi-bit value in the BHR comprises storing only a multi-bit value indicative of the number of iterations of the first loop in the BHR.

17. The method of claim 14 wherein storing a multi-bit value in the BHR comprises storing only a multi-bit value indicative of the number of iterations of the second loop in the BHR.

18. The method of claim 1, further comprising:
   determining that a conditional branch instruction is a non-loop-ending branch instruction;
   storing evaluation of the non-loop-ending branch instruction in the BHR as a taken or not-taken value; and
   preventing storage of evaluation of the loop-ending branch instruction in the BHR as a taken or not-taken value.

19. The method of claim 18, further comprising predicting evaluation of loop-ending branch instructions and non-loop-ending branch instructions based on a combination in the BHR of taken or not-taken values based on non-loop-ending branch instructions and the multi-bit value indicative of the total number of iterations of the loop-ending branch instruction.

20. The method of claim 1, wherein the one or more conditional branch instructions following the loop-ending branch instruction are non-loop branch instructions.

21. A processor, comprising:
   a branch predictor operative to predict an evaluation of conditional branch instructions;
   an instruction execution pipeline operative to speculatively fetch and execute instructions based on a prediction from the branch predictor;
   a Branch History Register (BHR) in the branch predictor operative to store at least the evaluation of conditional branch instructions;
   a Loop Counter (LC) in the branch predictor operative to count a total number of iterations of a code loop;
   a control circuit in the branch predictor operative to store in the BHR a multi-bit value equal to the total number of iterations of a loop ended by a loop-ending branch instruction upon termination of the loop; and
   a Branch Predictor Table in the branch predictor, indexed by at least the BHR, after termination of the loop, operative to yield a branch prediction for one or more conditional branch instructions following the loop-ending branch instruction, based at least in part on the multi-bit value stored in the BHR.

22. The processor of claim 21 further comprising a Last Branch PC (LBPC) register operative to store a PC of a conditional branch instruction, and wherein the control circuit determines a conditional branch instruction is associated with a loop if the PC of the branch instruction matches the contents of the LBPC register.

23. The processor of claim 22 further comprising two or more LBPC registers and a corresponding two or more LCs, a first LBPC operative to store a PC of a conditional branch instruction associated with a first loop and a first LC operative to maintain a count of iterations of the first loop, and a second LBPC operative to store a PC of a conditional branch instruction associated with a second loop and a second LC operative to maintain a count of iterations of the second loop, wherein the first loop is nested within the second loop.

24. The processor of claim 23, wherein the control circuit is operative to store in the BHR a multi-bit value indicative of the number of iterations of one execution of the first loop and a multi-bit value indicative of the number of iterations of the second loop.

25. The processor of claim 23, wherein the control circuit is operative to store in the BHR a multi-bit value indicative of the number of iterations of one execution of the first loop and to not store in the BHR an indication of the number of iterations of the second loop.

26. The processor of claim 23, wherein the control circuit is operative to store in the BHR a multi-bit value indicative of the number of iterations of the second loop and to not store in the BHR an indication of the number of iterations of any execution of the first loop.

27. The processor of claim 21 wherein the BHR is operative to increment a plurality of bits in response to each taken evaluation of the loop-ending branch instruction so as to maintain a loop iteration count directly in the BHR.

28. The processor of claim 21 further comprising thresholding logic operative to map a loop iteration count to a fixed, multi-bit value in response to a plurality of threshold values.

29. The processor of claim 21, wherein the wherein the one or more conditional branch instructions following the loop-ending branch instruction are non-loop branch instructions.

30. A branch prediction system, comprising:
  means for determining that a conditional branch instruction is a loop-ending branch instruction;
  means for counting a total number of iterations of a loop ended by the loop-ending branch instruction;
  means for storing a multi-bit value in a Branch History Register (BHR), the value equal to the total number of iterations of the loop upon termination of the loop; and
  means for indexing a Branch Predictor Table (BPT) with at least the BHR, after termination of the loop, to obtain a branch prediction for one or more conditional branch instructions following the loop-ending branch instruction, the branch prediction based at least in part on the multi-bit value stored in the BHR.

31. The branch prediction system of claim 30, wherein the wherein the one or more conditional branch instructions following the loop-ending branch instruction are non-loop branch instructions.

32. A non-transitory computer-readable medium including program code stored thereon, comprising:
  program code to determine that a conditional branch instruction is a loop-ending branch instruction;
  program code to count a total number of iterations of a loop ended by the loop-ending branch instruction;
  program code to store a multi-bit value in a Branch History Register (BHR), the value equal to the total number of iterations of the loop upon termination of the loop; and
  program code to index a Branch Predictor Table (BPT) with at least the BHR, after termination of the loop, to obtain a branch prediction for one or more conditional branch instructions following the loop-ending branch instruction, the branch prediction based at least in part on the multi-bit value stored in the BHR.

33. The non-transitory computer-readable medium of claim 32, wherein the wherein the one or more conditional branch instructions following the loop-ending branch instruction are non-loop branch instructions.

* * * * *